United States Patent [19]

Ferree et al.

[11] Patent Number: 5,488,703
[45] Date of Patent: Jan. 30, 1996

[54] SYSTEM FOR ESTABLISHING AND PERFORMING MULTIPLE CONVERSATIONS SIMULTANEOUSLY BETWEEN TRANSACTION PROGRAMS THROUGH LOGICAL UNITS

[75] Inventors: Marsha E. Ferree, Raleigh; James P. Gray, Chapel Hill, both of N.C.

[73] Assignee: International Business Machines Corporation, Armonk, N.Y.

[21] Appl. No.: 876,945

[22] Filed: May 1, 1992

[51] Int. Cl.⁶ .................................................. G06F 15/04
[52] U.S. Cl. .................. 395/200.12; 364/281.4; 364/281.3; 364/281.7; 364/DIG. 1
[58] Field of Search ................. 395/200; 379/209; 364/200; 370/60; 375/200.12

[56] References Cited

U.S. PATENT DOCUMENTS

| | | | |
|---|---|---|---|
| 4,688,035 | 8/1987 | Gray et al. | 340/825.52 |
| 4,972,437 | 11/1990 | Citron et al. | 375/37 |
| 5,051,892 | 9/1991 | Ferree et al. | 364/200 |
| 5,109,483 | 4/1992 | Baratz et al. | 395/200 |

*Primary Examiner*—Thomas C. Lee
*Assistant Examiner*—Sang Hui Kim
*Attorney, Agent, or Firm*—Stephen T. Keohane

[57] ABSTRACT

A method and system for establishing multiple parallel conversations between a single pair of instances corresponding to a pair of communicating transaction programs over a data communication network. Each conversation traverses the network between the two communicating transaction program instances over a corresponding logical unit-logical unit session. Each conversation may be independently disconnected or reconnected without the need for invoking additional instances of the communicating transaction programs.

10 Claims, 5 Drawing Sheets

SYSTEM FOR ESTABLISHING AND PERFORMING MULTIPLE CONVERSATIONS SIMULTANEOUSLY BETWEEN TRANSACTION PROGRAMS THROUGH LOGICAL UNITS

BACKGROUND OF THE INVENTION

I. Field of the Invention

The present invention relates to data communications and, more particularly, to a method of establishing multiple parallel conversations between two transaction programs with a single instance of each transaction program.

II. Prior Art

A communications network can be defined as a collection of "nodes" which are interconnected through "communications links". These terms are commonly used in descriptions of networks employing an architecture known as Systems Network Architecture (SNA). SNA will be described in general below although more comprehensive descriptions of the architecture may be found in a variety of manuals available from the assignee of the present invention. Manuals providing a more comprehensive description of SNA include Systems Network Architecture Technical Overview (GC30-3073) International Business Machines Corporation and Systems Network Architecture Concepts and Products (GC30-3072) International Business Machines Corporation. More comprehensive descriptions may be found in Systems Network Architecture: Format and Protocol Reference Manual: Architecture Logic for Type 2.1 nodes (SC30-3422) International Business Machines Corporation and Systems Network Architecture-Transaction Programmer's Reference Manual for LU Type 6.2 (GC30-3084) International Business Machines Corporation.

While the referenced manuals may provide additional information useful to the reader, those manuals are not required for an understanding of the present invention and are not incorporated herein by reference.

SNA is the description of the logical structure, formats, protocols, and operational sequences for transmitting information units through networks and for controlling the configuration and operation of networks. In SNA, the physical network consists of actual processors, called nodes, and data links between the nodes. The logical network consists of logical processors, called logical units (LUs), and logical connections called sessions. One or more sessions connect one LU to another LU. Information is transmitted from one LU to another LU over a session.

LU 6.2 is a particular type of SNA logical unit. LU 6.2 provides a connection, or port, between connection transaction programs and network resources. Each LU 6.2 makes a set of resources available to the transaction programs.

Transaction programs process transactions. A transaction is a type of application. It usually involves a specific set of input data and triggers the execution of a specific process or job. One example is the entry of a customer's deposit and the updating of the customer's balance.

A transaction program, as used herein, is a program that is executed by or within LU 6.2 and performs services related to the processing of a transaction. For example, the program may be an application program that processes a transaction or is one of several programs that make up a transaction processing application.

Distributed processing of a transaction within an SNA network occurs when transaction programs communicate by exchanging information over the sessions between their LUs, treating the session as a resource that is shared between the programs.

Among the services that SNA and, in particular, LU 6.2 provides is interprogram communication. Interprogram communication permits distribution of the processing of a transaction among multiple programs within a network. The programs coordinate the distributed processing by exchanging control information or data.

The transaction programs communicate with one another, or have a "conversation", by exchanging "verbs", or formatted functions conforming to a predefined protocol. In order to be able to communicate with one another, an LU-to-LU (LU-LU) "session", or data path through the network, must be established.

The current process by which LU-LU sessions are established is well-known. The process begins when a user, or transaction program (TP), sends an ALLOCATE verb to its own logical unit. Certain parameters are supplied with this ALLOCATE verb. The parameters include, inter alia, the name of the remote LU at which a remote transaction program is located, the network properties for the session to be allocated to a conversation between two TPs and the name of the remote TP.

Assuming the network can support a conversation between two TPs, the primary LU establishes an LU-LU communication to the remote LU. This entails extensive network communication between the various network elements such as the network control points and link stations. The particulars of the intra-network-element communication required for LU-LU session establishment are transparent to the TPs and the details are unnecessary for understanding the present invention. Network element communication during an LU-LU session is discussed in depth in Citron et al., U.S. Pat. No. 4,972,437. For the purposes of describing the present invention, an LU-LU session is established between the primary LU and remote LU either prior to or as a result of a transaction program initiating a conversation with another transaction program.

An example of the establishment of a transaction program conversation is where transaction program, TP A, wishes to establish a conversation with a partner program, TP B. In this case, TP A issues an ALLOCATE verb to establish the conversation. Where TP A wishes to establish multiple conversations with TP B, TP A issues multiple ALLOCATE verbs to TP B thereby invoking multiple instances, or executable copies, of TP B, one instance of TP B per conversation.

This is satisfactory for many transaction program designs, but is unacceptable for others. A requirement has arisen for a transaction program to have the capability to establish multiple, parallel, conversations with the same instance of the partner transaction program.

For example, in order to spread the flow of the requested data, the data base program establishes multiple conversations with the originating transaction program by establishing multiple instances of the data base program. An example of this is shown in FIG. I, where a data communication network 10 is illustrated. Network 10 includes a plurality of LUs 12A, 12B, 12C and 12D, each of which provides access to the network 10. The network 10 may conform to the International Business Machines Corporation (IBM) Systems Network Architecture (SNA) LU Type 6.2 which is described in the publications listed above.

In the illustrated network, TP A initiates a conversation with TP B by issuing an ALLOCATE verb to its local LU 12A and, as defined in the LU Type 6.2 network, a session 14 is seized for the initiated conversation. TP A requests three files, as an example, from the transaction program TP B. TP B can send the files in series over the conversation on session 14. Alternatively, if TP A wishes to establish two additional conversations with TP B, TP A issues two additional ALLOCATE verbs. This does not, however, cause multiple conversations to be established with the same instance of TP B; rather, it causes multiple instances of TP B to be invoked, i.e., TP B' and TP B", each of the additional conversations being conveyed over sessions 15 and 16, respectively. In this case, unless the various instances TP B, TP B', and TP B" can communicate with one another, the flow of the data files is inefficient as, for example, duplicate file transfer may occur. In either case, an undesirable result follows as a consequence of the attempt to shorten the transmission time of the files.

SUMMARY OF THE INVENTION

The present invention contemplates a method and system for establishing multiple parallel conversations between a single pair of instances corresponding to a pair of communicating transaction programs over a data communication network. Each conversation traverses the network between the two communicating transaction program instances over a corresponding LU-LU session. Each conversation may be independently disconnected or reconnected without the need for invoking additional instances of the communicating transaction programs.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
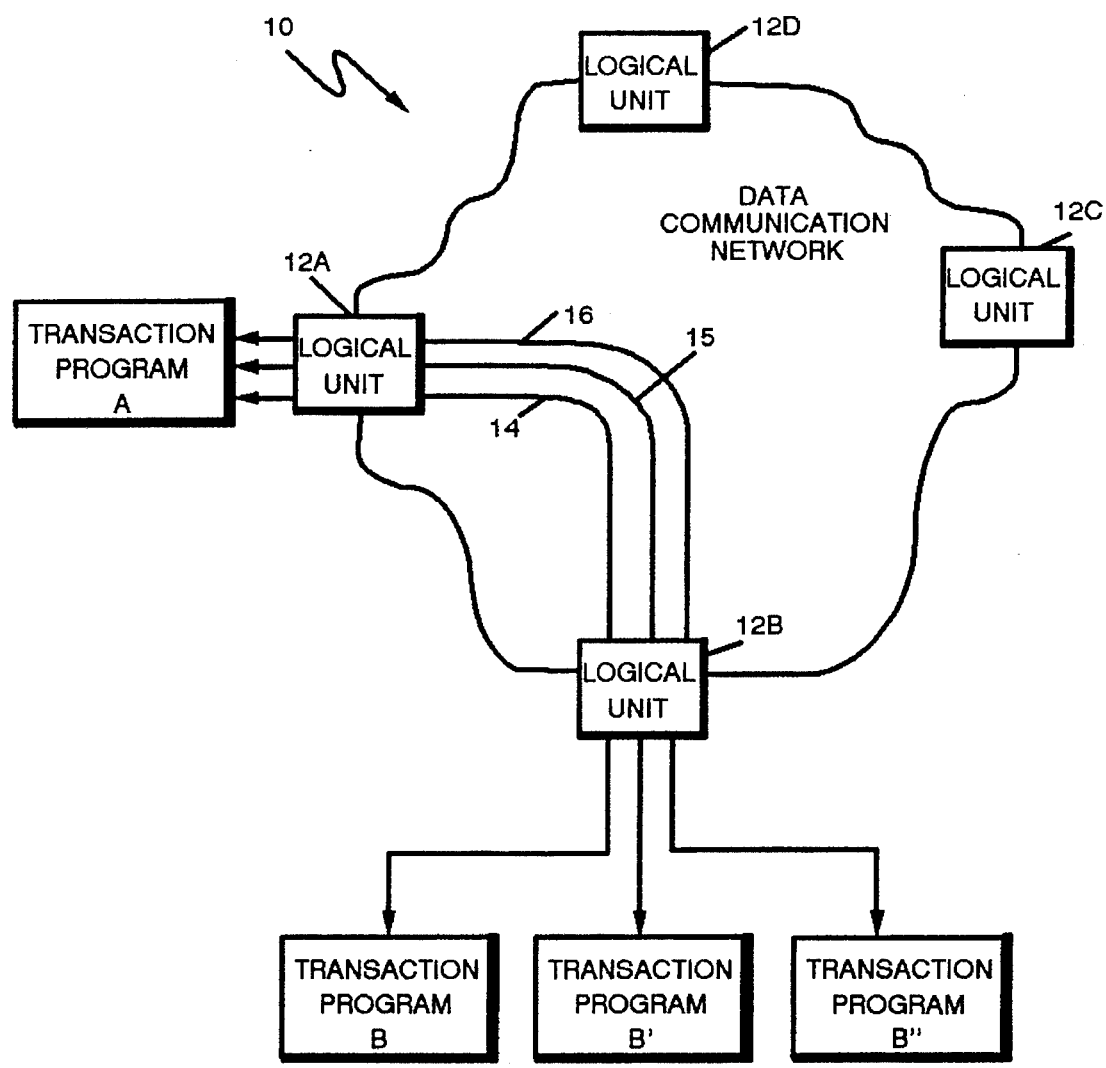
FIG. 1 is a simplified diagram illustrating a data communication network employing a prior art method of having multiple conversations.
Figure 2:
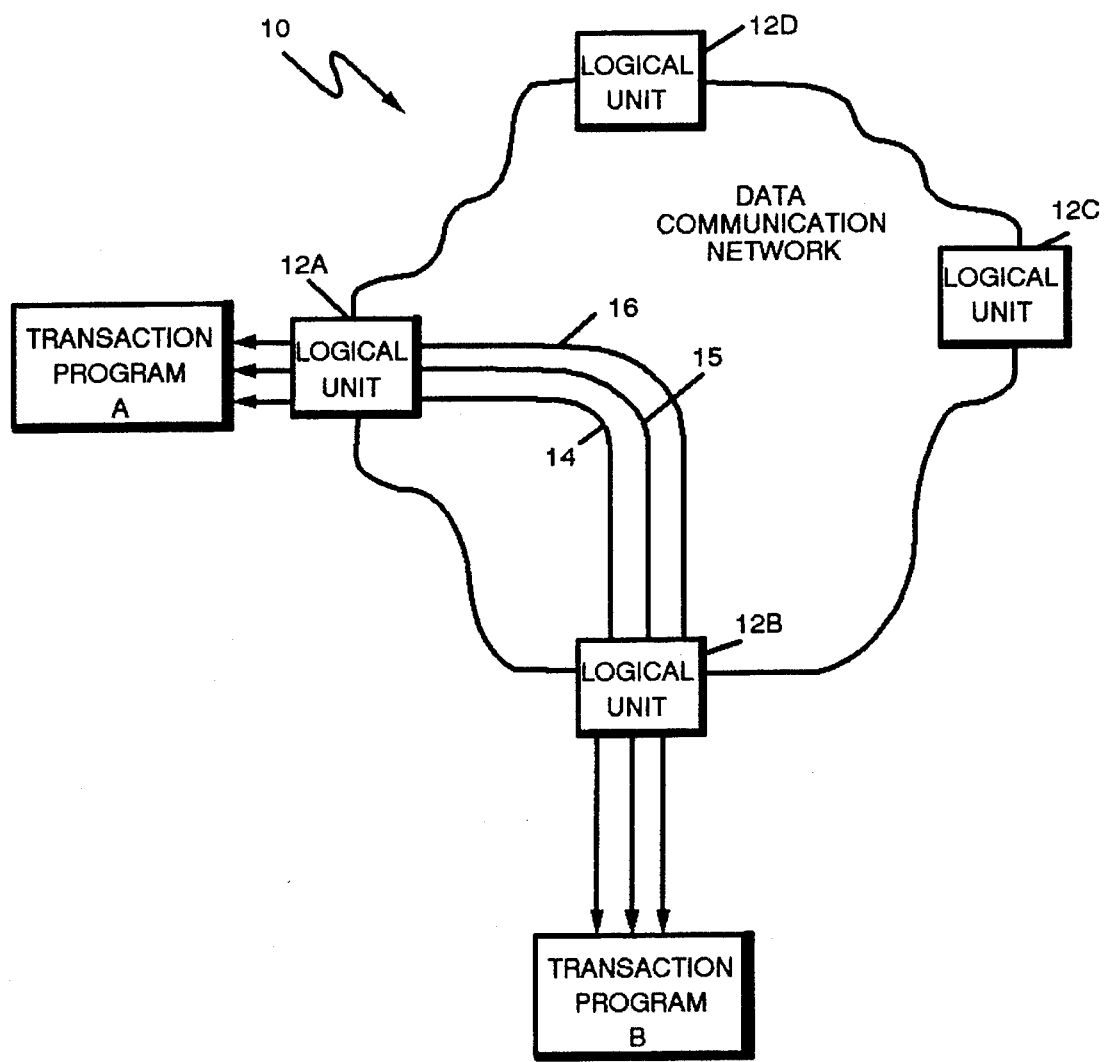
FIG. 2 is a simplified diagram illustrating a data communication network employing the method of the present invention of two transaction programs having multiple, parallel conversation.

FIG. 2 illustrates the same data communication network 10 described above except that the transaction programs TP A and TP B are employing the method of the present invention. In contrast to the situation described above, TP A and TP B are able to communicate by having multiple, parallel conversations without the requirement of multiple instances of either transaction program; rather, only a single instance of each transaction program is required. In particular, in this case, the transaction programs are having three conversations, the three conversations being conveyed over sessions 14, 15 and 16, respectively. In contrast to the system illustrated in FIG. 1, the three conversations are between single instances of the transaction programs, TP A and TP B rather than between the various plurality of instances previously required.

The communication takes place in a conversation which can be started by either transaction program. The conversation is invoked when one of the end user transaction programs issues an ALLOCATE verb and appropriate parameters to the LU to which it is logically connected. The verb ALLOCATE and the parameters associated therewith are defined in the Transaction Programmer's Reference Manual for LU Type 6.2 cited above. In addition, this manual describes all of the verbs associated therewith in the IBM SNA LU Type 6.2 architecture.

In order to implement parallel conversations, changes were made to a number of the verbs and a number of new verbs were added.- The various changes are detailed below.
A. Summary of Verb Changes The main elements of the parallel conversations design are:

A new bit in the BIND request and BIND response that indicates whether the two LUs establishing the session support parallel conversations;

New LU 6.2 verbs, named DUPLICATE (or MC_DUPLICATE) and ACCEPT_DUPLICATE, that allow parallel conversations to be allocated by a source transaction program and received by a target TP; and A new FMH-5(Duplicate) header that flows as a result of the new DUPLICATE verb.

Each of these elements is discussed in detail in the following sections.
1. New Indicator in BIND Request and BIND Response In order to establish at session initiation time whether duplication of conversations (i.e., parallel conversations) is supported by the LUs at the session endpoints, a new bit in the BIND request and response is introduced.

If both LUs support duplication, as indicated in the BIND request/response, transaction programs at the LUs can request that parallel conversations be established. If neither, or only one, of the LUs supports duplication, transaction programs at the LUs cannot utilize parallel conversations. If a program requests parallel conversations to a partner program residing on an LU that does not support duplication, the requesting program is returned a return code of ALLOCATION_ERROR—DUPLICATE_NOT_SUPPORTED_BY_LU. (Return codes are indications of the result of the verb execution—for example, indicating an error.)

Support for duplication can be on a per mode name basis. That is, LUs can choose to support duplication of conversations on some modes, but not on others.

However, if the LUs support duplication on a given mode name, all FMH-5(Attach)s that flow on that mode name will carry a conversation correlator. This will be discussed below. If an LU supports duplication on a particular mode name and incorrectly sends an FMH-5(Attach) without a conversation correlator, and later one of the programs issues a DUPLICATE, the program is passed a return code to DUPLICATE of ALLOCATION_ ERROR—CANNOT_PERFORM_REQUEST_NO_RETRY. The FMH-5(Attach) will not be rejected simply because it did not have a conversation correlator.
2. New LU 6.2 Verbs Three new LU 6.2 verbs, called DUPLICATE, MC_DUPLICATE, and ACCEPT_DUPLICATE, are introduced. A transaction program issues DUPLICATE, instead of ALLO- CATE, when it wishes to establish a subsequent basic conversation in parallel with one or more earlier basic conversations. DUPLICATE has to be preceded by an initial ALLOCATE to the target program because the semantics of DUPLICATE are to create another copy of a conversation that is already active. However, the program that issues DUPLICATE does not have to be the program that issued the initial ALLOCATE. In other words, TP A can ALLOCATE to TP B, after which either TP A or TP B may issue DUPLICATE.

MC_DUPLICATE has the same properties, except that it is used to duplicate a mapped conversation.

The remainder of this description concentrates on the DUPLICATE, rather than MC_DUPLICATE, verb. The same examples and processing apply to MC_DUPLICATE as apply to DUPLICATE. However, for the sake of brevity, only DUPLICATE is discussed from this point onward. Unless otherwise noted, any discussion that applies to the DUPLICATE verb also applies to MC_DUPLICATE.

All conversations within a parallel conversation group will be of the same conversation type, that is, all conversations will be basic conversations, or all conversations will be mapped. The transaction program is not given the capability to change from one to another within the same parallel conversation group. The reason for this is because no requirement has arisen to mix and match conversation types within a parallel conversation group. Further, it is expected that the parallel conversation support will be used primarily by service transaction programs that will require basic conversations only.

When a program issues a DUPLICATE or MC_DUPLICATE, the local LU determines, based upon the information exchanged in a BIND request and response, whether the partner LU supports duplication of conversations. If the partner LU does not support duplication, the program is passed a return code of ALLOCATION_ERROR—DUPLICATE_NOT_SUPPORTED_BY_LU.

If the partner LU does support duplication, the local LU creates an FMH-5(Duplicate) header. When the partner LU receives the FMH-5(Duplicate), it determines whether the transaction program specified in the FMH-5(Duplicate) supports duplication. If the program does not support duplication, the LU rejects the FMH-5(Duplicate). The initiating program receives a return code of ALLOCATION_ERROR—DUPLICATE_NOT_SUPPORTED_BY_PGM on the next verb it issues against the requested conversation to which can be returned an ALLOCATION_ERROR return code.

The last verb, ACCEPT_DUPLICATE, is issued by the program that is the target of the DUPLICATE or MC_DUPLICATE verb. A program has to know that it is supposed to issue one or more ACCEPT_DUPLICATE verbs (i.e., one for each associated DUPLICATE (or MC_DUPLICATE) verb). This knowledge can either be coded into the logic of the program, or the program that issues DUPLICATE (or MC_DUPLICATE) can inform the partner, via the initial conversation, that a parallel conversation is being established and that the partner should issue the ACCEPT_DUPLICATE verb. There are two variations of ACCEPT_DUPLICATE. One variation waits for the duplicate conversation request to arrive at the LU, if it has not already done so. The second variation does not Wait for the request to arrive, but instead returns immediately to the program with a successful or unsuccessful return code, depending upon whether the request has arrived.

3. Format of FMH-5(Attach)

There is no change to the format of the FMH-5(Attach) as a result of the parallel conversations design described within this DCM. Note, however, that if two LUs support duplication on a given mode name (as established during the BIND request/response exchange), all FMH-5(Attach)s flowing on sessions having that mode name must carry a conversation correlator.

4. Conversation Correlators

A conversation correlator is a 1- to 8-byte field that is unique within the LU generating the conversation correlator. Since the conversation correlator is unique only within the generating LU, it is possible for two LUs to coincidentally generate the same correlator, but for different conversations. Because of this possibility, a fully-qualified conversation correlator is defined. A fully-qualified conversation correlator consists of the fully-qualified LU name of the LU that generated the conversation correlator, plus the 1- to 8-byte conversation correlator value itself. In this way, if two LUs each happen to generate the same conversation correlator value, no confusion will result because of the use of the fully-qualified LU name. As will be shown in the following section, it is not necessary to actually flow the fully-qualified conversation correlator.

The conversation correlator is used to determine the correct instance of the transaction program. Notice that the FMH-5(Duplicate) does not carry a transaction program name (TPN). This is because the TPN is not a unique identifier of a transaction program instance. That is, it is possible for multiple instances of a transaction program, all having the same TPN, to be concurrently active. However, only one of the instances will be associated with the conversation correlator carried in the FMH-5. In this way, the conversation correlator allows a unique instance of a transaction program to be determined.

5. Format of FMH-5(Duplicate)

In addition to the two new LU 6.2 verbs already discussed, the parallel conversations design introduces a new FMH-5 command value. Currently, there are already two types of FMH-5s: one in which the Command field indicates Attach, the other in which the Command field indicates Reconnect. An FMH-5(Attach) flows as a result of an ALLOCATE and causes a new transaction program instance to be invoked at the target LU. An FMH-5(Reconnect) is generated as a result of a RECONNECT verb.

The new type of FMH-5 being introduced has a command field that indicates Duplicate. One of the pieces of information that flows in an FMH-5(Duplicate) is the conversation correlator of the original conversation to be duplicated. In order for the duplication request to be successful, this conversation correlator has to have flowed in the prior FMH-5(Attach) that caused the original conversation to be established. In addition to this conversation correlator that is shared by all conversations within a parallel conversation group, a second conversation correlator may optionally be carried in the FMH-5(Duplicate). This second conversation correlator will be unique to the conversation being established as a result of the FMH-5(Duplicate). The purpose of this second conversation correlator is to uniquely identify the new conversation so that at a later point a Reconnection of the conversation may take place. If a Reconnection of the conversation occurs, the FMH-5(Reconnect) that flows will carry the second, unique, conversation correlator. Note that if the original conversation is to be Reconnected, the original, shared, conversation correlator will flow in the FMH-5(Reconnect). That is, for the original conversation that was established as a result of a FMH-5(Attach), both the parallel conversation correlator and the unique conversation correlator are identical.

Figure 3:
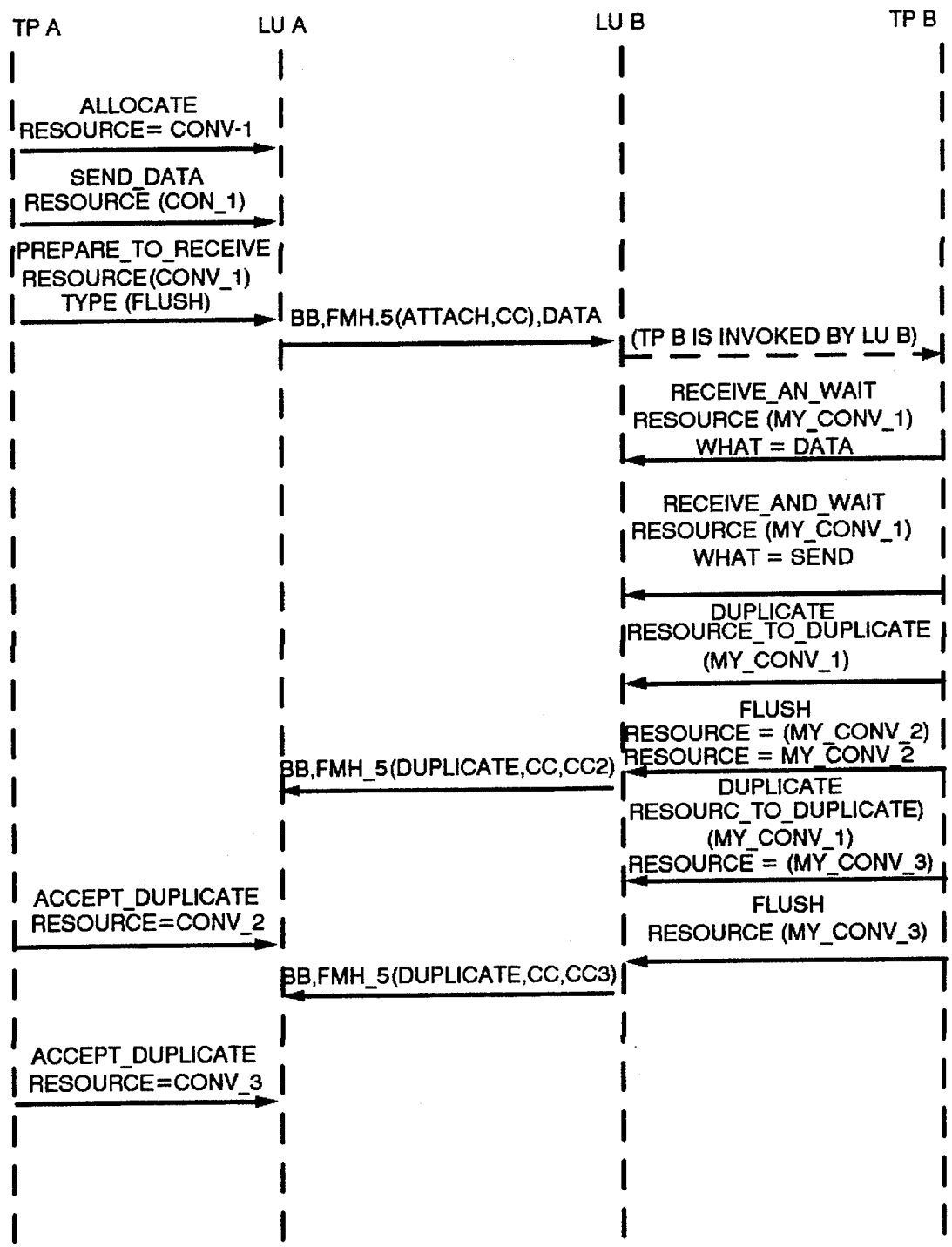

FIG. 3 is a diagram illustrating an example showing the establishment of multiple (three) conversations between single instances of TP A and TP B. It should be noted that many verbs and parameters are omitted in order that the figure be simplified. In this example, TP A wants to receive a large amount of data from TP B, which is, perhaps, a data base program. Initially, TP A issues an ALLOCATE verb to LU A, its associated logical unit. It is assumed that a session exists already between LU A and LU B and that both LUs support parallel conversations. The parameter RESOURCE is given the value "CONV_1" by LU A. (Where a parameter is followed by an "=" sign, the parameter is given a value by the corresponding LU. Where a parameter is enclosed in parentheses, the parameter value is given by the corresponding transaction program.)

Next, TP A issues a SEND_DATA command as it wishes to send data to TP B, for example, the data specifying which three files to transfer. TP A then issues a PREPARE_TO_RECEIVE, indicating that it is ready to receive.

LU A communicates to LU B with a string of control signals including BB to begin conversation, FMH_5(Attach, CC) for creating a new instance of TP B, CC representing the Conversation Correlator for identifying the conversation, and the associated data.

TP B is invoked by LU B and issues two RECEIVE_AND_WAIT verbs, telling LU B that it is ready to receive data on its resource MY_CONV_1. TP B then issues a DUPLICATE command for creating a second conversation by duplicating the first conversation. LU B begins the second conversation by sending the appropriate control and data signals to LU A. TP A accepts the duplication of conversation 1. TP B then duplicates MY_CONV_1 again by issuing another DUPLICATE verb, thereby creating a third conversation between the single instance of TP A.

Figure 4:
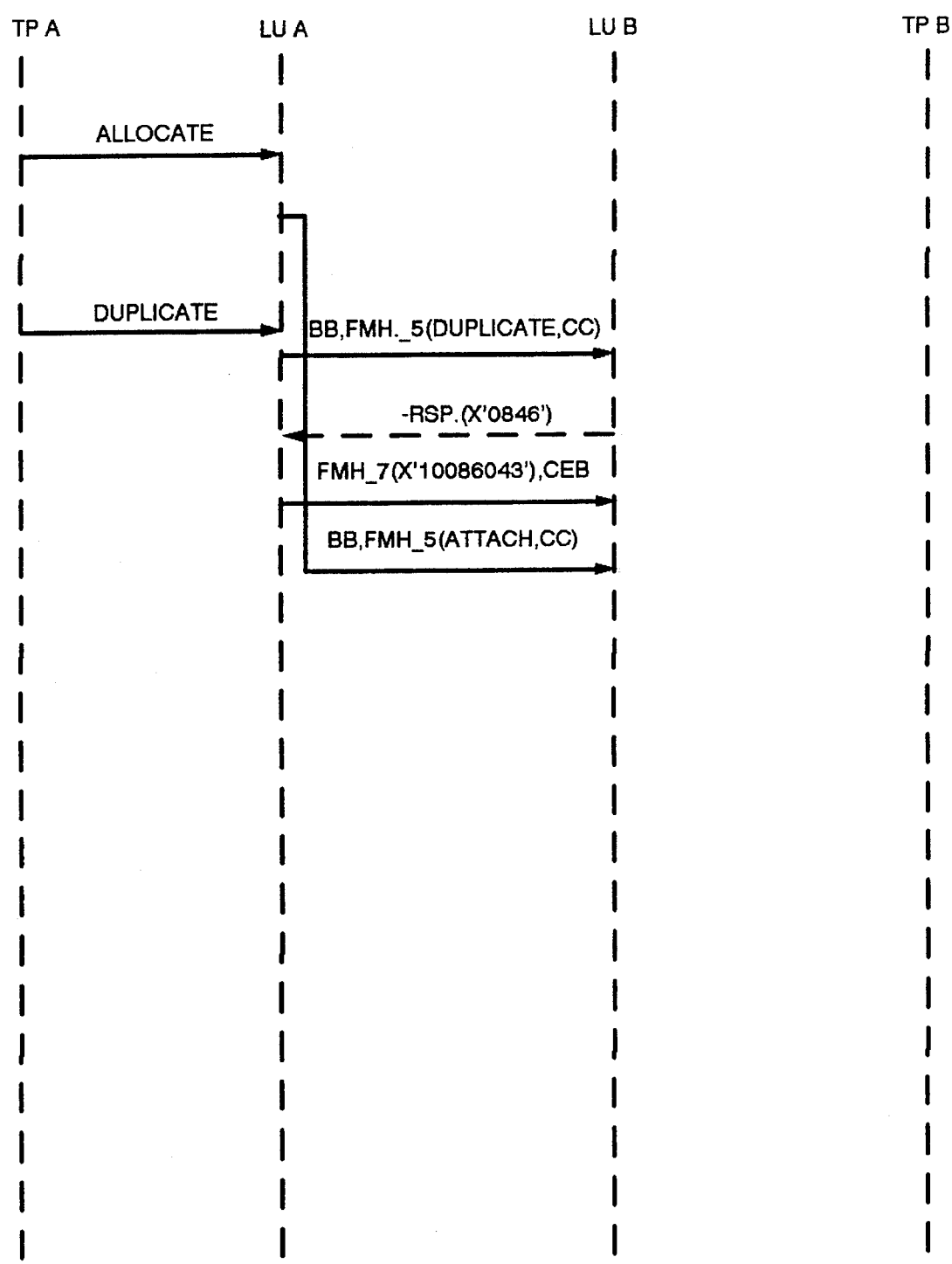
FIG. 4 is another flow diagram illustrating another scenario of the flow of verbs and control/data signals conveyed between the transaction programs and the logical units.

FIG. 4 illustrates a situation where a DUPLICATE request overtakes an ALLOCATE request. This situation can occur where the session over which the ALLOCATE is transmitted is much slower than the session over which the DUPLICATE is conveyed. Here, because there is no conversation to duplicate, LU B responds with an error code indicating that it cannot perform the request.

Figure 5:
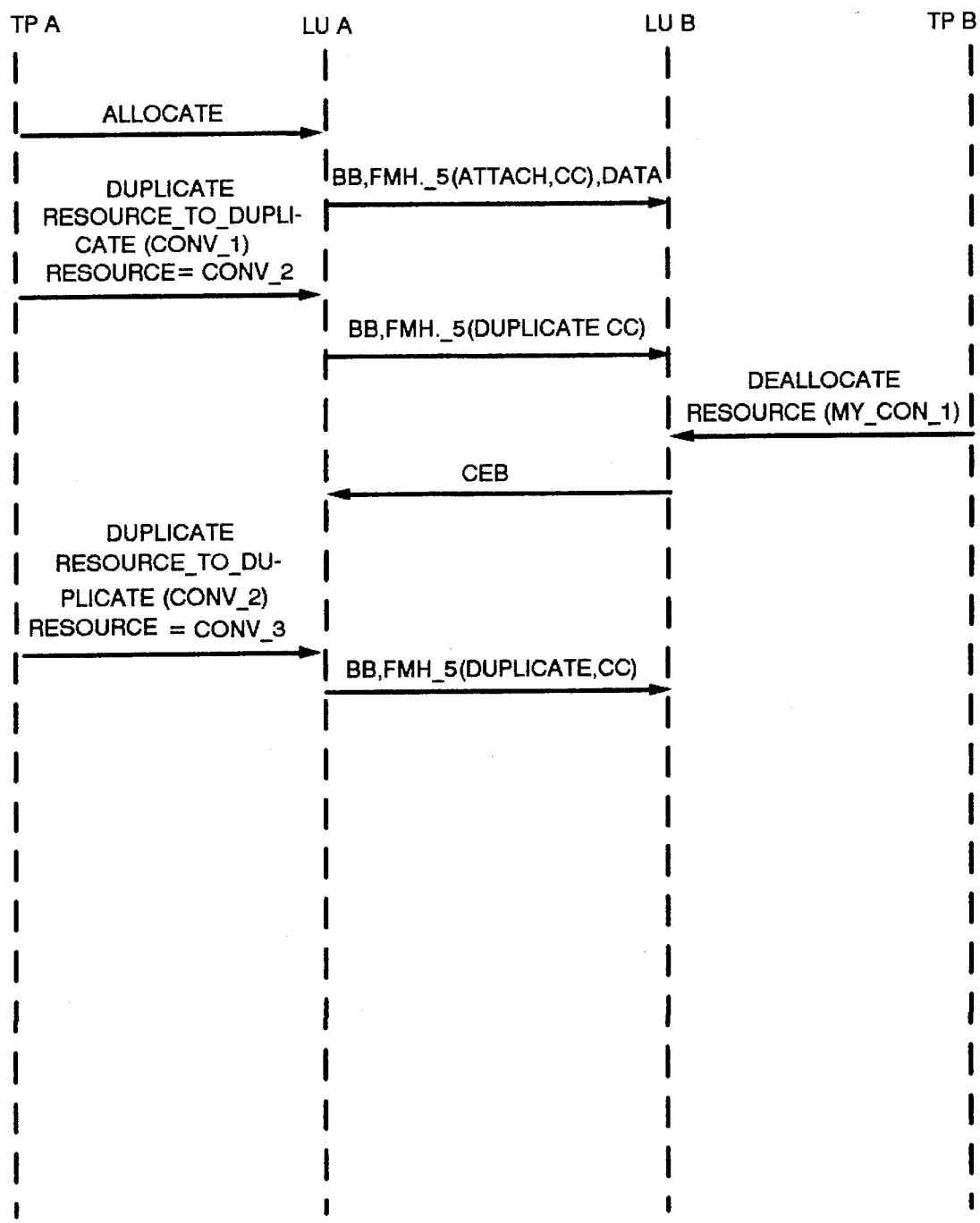
FIG. 5 is yet another flow diagram illustrating another scenario of the flow of verbs and control/data signals conveyed between the transaction programs and the logical units.

FIG. 5 illustrates that conversations can be dynamically activated and deactivated and the duplication process can occur so long as there is at least one active conversation at the time of the DUPLICATE request. TP A initiates conversation 1 and duplicates it, thereby making two parallel conversations, CONV_1 and CONV_2. TP B deallocates, or ends, the first conversation. Conversation 2 can still be duplicated, as it is still active.

These three scenarios are by no means an exhaustive listing of the possible network activity as many other scenarios could arise. These illustrations, however, show how the method of the present invention allows for the establishment of multiple parallel conversations between a single pair of transaction program instances over a data communication network. As illustrated, each conversation traverses the network between the two communicating transaction program instances over a corresponding LU-LU session. Each conversation may be independently disconnected or reconnected without the need for invoking additional instances of the communicating transaction programs. This allows the transaction programs to dynamically configure their conversations in order to maximize the data throughput in the most efficient manner.

While the invention has been particularly shown and described with reference to preferred embodiments thereof, it will be understood by those skilled in the art that various other changes in form and detail may be made without departing from the spirit and scope of the invention.

We claim:

1. A method of establishing a plurality of conversations between a single instance of a first transaction program and a single instance of a second transaction program over a communication network which includes at least first and second logical units (LUs) connected, respectively, to said first and second transaction programs and to each other by a plurality of LU-LU communication sessions over which electronic signal representing both data and control are exchanged under control of said transaction programs, said method comprising steps of:

establishing a communication link between a single instance of a first transaction program and a single instance of a second transaction program; and initiating a first conversation between said single instance of said first transaction program and said single instance of said second transaction program over a first LU-LU communication session using said first and second LUs so that data and control signals may be exchanged therebetween; and initiating a second conversation between said single instance of said first transaction program and said single instance of said second transaction program over a second LU-LU communication session using said first and second LUs so that data and control signals may be exchanged between said single instance of said first transaction program and said single instance of said second transaction program, over said first and second LU-LU communication sessions; and wherein said first and second conversations occur simultaneously over said LU-LU communications sessions.

2. The method as defined in claim 1 further comprising the step of initiating additional conversations between said single instance of one of said transaction programs and said single instance of the other transaction program over corresponding additional LU-LU communication sessions while at least one conversation remains active.

3. The method as defined in claim 2 wherein said first conversation initiating step further comprises the step of conveying data between said first and second transaction programs.

4. The method as defined in claim 1 further comprising, before said first conversation initiating step, the step of determining whether said first and second transaction programs are capable of having a plurality of conversations between said single instances of said first and second transaction programs.

5. The method as defined in claim 4 wherein said determining step further comprises the step of indicating whether at least one of said transaction programs is incapable of having a plurality of conversations between said single instances of said first and second transaction programs.

6. A system of establishing a plurality fop conversation between a single instance of a first transaction program and a single instance of a second transaction program over a communication network which includes at least first and second logical units (LUs) connected, respectively, to said first and second transaction programs and to each other by a plurality of LU-LU communication sessions over which electronic signals representing both data and control are exchanged under control of said transaction programs, said system comprising:

means for establishing a communication link between a single instance of a first transaction program and a single instance of a second transaction program; and means for initiating a first conversation between said single instance of said first transaction program and said single instance of said second transaction program over a first LU-LU communication session using said first and second LUs so that data and control signals may be exchanged therebetween; and means for initiating a second conversation between said single instance of said first transaction program and said single instance of said second transaction program over a second LU-LU communication session using said first and second LUs so that data and control signals may be exchanged between said single instance of said first transaction program and said single instance of said second transaction program over said first and second LU-LU communication sessions; and wherein said first and second conversations occur simultaneously over said LU-LU communications sessions.

7. The system as defined in claim 6 further comprising means for initiating additional conversations between said single instance of one of said transaction programs and said single instance of the other transaction program over corresponding additional LU-LU communication sessions while at least one conversation remains active.

8. The system as defined in claim 7 wherein said first conversation initiating means further comprises means for conveying data between said first and second transaction programs.

9. The system as defined in claim 6 further comprising means for determining whether said first and second LUs support having a plurality of conversations between said single instances of said first and second transaction programs.

10. The system as defined in claim 9 wherein said determining means further comprises means for indicating to said first conversation initiating means that at least one of said LUs does not support having a plurality of conversations between said single instances of said first and second transaction programs.

* * * * *